United States Patent
Erbe

(10) Patent No.: US 9,482,842 B2
(45) Date of Patent: Nov. 1, 2016

(54) OPTICAL ASSEMBLY COMPRISING A MOUNT HAVING THERMALLY DEPENDENT FORCE COMPENSATION

(71) Applicant: JENOPTIK Optical Systems GmbH, Jena (DE)

(72) Inventor: Torsten Erbe, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 15/024,588

(22) PCT Filed: Sep. 25, 2014

(86) PCT No.: PCT/DE2014/100342
§ 371 (c)(1),
(2) Date: Mar. 24, 2016

(87) PCT Pub. No.: WO2015/043581
PCT Pub. Date: Apr. 2, 2015

(65) Prior Publication Data
US 2016/0246028 A1    Aug. 25, 2016

(30) Foreign Application Priority Data
Sep. 27, 2013   (DE) .................. 10 2013 110 750

(51) Int. Cl.
*G02B 7/02* (2006.01)
*G02B 7/00* (2006.01)
*G02B 7/18* (2006.01)

(52) U.S. Cl.
CPC ............... *G02B 7/028* (2013.01); *G02B 7/003* (2013.01); *G02B 7/008* (2013.01); *G02B 7/026* (2013.01); *G02B 7/1815* (2013.01)

(58) Field of Classification Search
CPC ...... G02B 7/028; G02B 7/008; G02B 7/1815; G02B 7/003; G02B 7/026
USPC ........................................... 359/820
See application file for complete search history.

(56) References Cited

U.S. PATENT DOCUMENTS

| | | | |
|---|---|---|---|
| 5,523,893 A | 6/1996 | Haas | |
| 6,388,823 B1 | 5/2002 | Gaber et al. | |
| 7,139,137 B2 | 11/2006 | Sudoh | |
| 2008/0239270 A1* | 10/2008 | Bischoff | G02B 7/008 355/67 |
| 2010/0033728 A1* | 2/2010 | Jacobson | G01J 3/02 356/451 |
| 2010/0097697 A1 | 4/2010 | Takemura et al. | |
| 2011/0096314 A1 | 4/2011 | Sato | |

(Continued)

FOREIGN PATENT DOCUMENTS

| | | |
|---|---|---|
| DE | 31 16579 A1 | 6/1982 |
| DE | 198 27 603 A1 | 12/1999 |

(Continued)

*Primary Examiner* — Scott J Sugarman
*Assistant Examiner* — Daniele Manikeu
(74) *Attorney, Agent, or Firm* — Duane Morris LLP

(57) ABSTRACT

Thermally compensated optical assembly comprising a monolithic mount which is divided by slits into a mounting ring and at least three elastic links which are connected to an optical element. The elastic links compensate the thermal expansion differences between the mounting ring and the optical element through deformation. The temperature-dependent reaction forces brought about by the deformation are compensated. For this purpose, the quantity of compensation elements is equal to the quantity of links. The compensation elements comprise in each instance an expansion body and a spring element.

13 Claims, 4 Drawing Sheets

(56) References Cited

U.S. PATENT DOCUMENTS

2011/0164330 A1* 7/2011 Henriksen ............... G02B 3/12
                                                    359/820
2013/0057855 A1* 3/2013 Doyle .................... G02B 7/008
                                                    356/237.5
2015/0055233 A1   2/2015 Erbe et al.

FOREIGN PATENT DOCUMENTS

| DE | 10 2006 060 088 A1 | 6/2008 |
| DE | 10 2010 008 756 A1 | 6/2011 |
| DE | 10 2010 022 934 A1 | 12/2011 |
| DE | 10 2013 109 185 B3 | 5/2014 |

* cited by examiner

Prior Art

Prior Art

OPTICAL ASSEMBLY COMPRISING A MOUNT HAVING THERMALLY DEPENDENT FORCE COMPENSATION

RELATED APPLICATIONS

The present application is a U.S. National Stage application of International PCT Application No. PCT/DE2014/100342 filed on Sep. 25, 2014 which claims priority benefit of German Application No. DE 10 2013 110 750.8 filed on Sep. 27, 2013, the contents of each are incorporated by reference in their entirety.

FIELD OF THE INVENTION

The invention is directed to a thermally compensated optical assembly having a mount and an optical element mounted therein.

BACKGROUND OF THE INVENTION

Basically, mounts for optical elements are constructed based on requirements for imaging quality and the given conditions of transport, storage and use of the optical system of which the mounted optical element forms a component part. Particularly at issue are anticipated shock loads, possible temperature fluctuations during transport, storage and use, and influences of radiation energy and radiation spectrum during use. These stresses notwithstanding, the optical element must be held in the mount in a defined position durably and under low tension.

In view of the aforementioned requirements for an assembly according to the invention, prior-art assemblies, or mounts as component parts thereof, will be considered as such in the following only insofar as they—like an assembly according to the invention—hold an optical element in a mount which allows a radial expansion compensation between the material of the mount and the material of the optical element over a predetermined temperature range. Assemblies of this type are referred to as thermally compensated.

Mounts of the type mentioned above often comprise a rigid mounting ring and a plurality of elastic links by which an optical element is connected to the mounting ring directly or indirectly via an auxiliary mount. The elastic links compensate for the radially variable expansion of the optical element and mounting ring by deforming in a reversible manner, whereby a reaction force is brought about which counteracts the deformation and acts on the optical element at connection points between the elastic links and the optical element. Through a targeted selection of material and constructional implementation of the links such that they are radially compliant or through special steps for configuring the optical element which are intended to prevent operative forces from leading to stresses in the optically active regions, it has been attempted in the prior art to minimize the effect of differential expansion or to shift the location in which the differential expansions operate.

Laid Open Application DE 10 2006 060 088 A1 discloses an optical assembly having a mounting ring (referred to in the cited reference as "holder") at which are formed along the inner circumferential surface three elastic links which are integrally connected to the mounting ring and by which the mounting ring is connected to a lens. In each instance the links comprise a flexural element (referred to in the cited reference as "web") which medially and tangentially contacts the optical element at connection points, and the ends of this flexural element transition into the mounting ring. Because of the radial elastic compliance of the tangentially contacting flexural elements, different thermal expansions between the optical element and the mount can be compensated and the optical element is held under low tension within a given temperature range. The optical element is held so as to be constantly centered. In the basic state of the optical assembly at normal temperature, the flexural elements are relaxed. When there is a change in temperature, they are increasingly tensioned radially so that an increasingly larger reaction force, which presents as a compressive force or a tensile force depending on the direction of the reaction force, acts on the connection points in radial direction.

An optical arrangement known from DE 10 2010 008 756 A1 also has a monolithic mount and an optical element held therein in a rotationally symmetrical manner via three elastic links (referred to in the cited reference as "spring leg arrangements"). The spring leg arrangements are formed in each instance by two parallel spring legs (flexure elements), one end of each of the parallel spring legs transitions into a mounting ring (referred to in the cited reference as "outer mount region") and the other ends terminate in a contact foot to which the optical element is fixed by gluing or soldering. The two parallel spring legs also act as flexure elements in this case and are arranged so as to be spaced apart from one another in direction of their compliance, i.e., perpendicular to the optical axis of the optical element, the gap therebetween being small in proportion to their length. From the point of view of the optical element, they extend along a concave line of curvature. During a radial expansion of the optical element, this optical element exerts radially operative forces on the contact feet, which results in the deflection of the parallel spring legs in a plane perpendicular to the optical axis. In contrast to a simple spring leg which is fixed on one side, there is no bending moment in the region of contact with the optical element, which would be explained by the fact that the spring leg arrangement itself generates a moment in the contact region which counteracts the torque exerted by the optical element, as a result of which the contact foot can only execute a translational movement. Therefore, the parallel spring legs are increasingly tensioned as the temperature increases over normal temperature, so that an increasingly greater reaction force acts on the connection points in radial direction, presenting a compressive force or a tensile force depending on the direction of the reaction force. An optical assembly with a similar mount is known from DE 10 2010 022 934 A1.

The not-prior-published DE 10 2013 109 185 B3 discloses an optical assembly comprising a rotationally symmetrical optical element and a monolithic mount having a mounting ring and at least three links (referred to in the cited reference as "connection units") by which the optical element is connected to the mounting ring. The links comprise three interconnected couplers which have certain length ratios with respect to one another and are connected to one another and to the mounting ring via flexure bearings. The couplers are considered to be stiff within the movement range of the link so that the deflection of the link can be represented by a transmission diagram for a coupling transmission. The optical element is fastened to one of the links in each instance via a fastening point which is guided in each instance on a straight line. The flexure bearings are elastically deformed with the deflection of the links so as to cause restoring forces in the flexure bearings which cooperate through flow of force to bring about a reaction force in direction of the straight lines for connection to the associated fastening point.

It has been pointed out in the above-cited references that it is merely advantageous to construct the mounts as monolithic components and that mounts based on the demonstrated principles can also be implemented through discrete components.

A mount assembly with a monolithic mount comprising a mounting ring and elastic connection mechanisms is disclosed in US 2011/0096314 A1. The connection mechanisms are formed in each instance by a chain of connection elements which are connected to one another by flexure bearings. During deflection of the flexure bearings due to differential expansions, a restoring force is also brought about here depending on the degree of deflection and depending on the temperature.

In a mount assembly shown in U.S. Pat. No. 7,139,137 B2, an optical element is held inside a mounting ring indirectly via discrete spring elements. Compression elements mounted in the mounting ring act at the spring elements, and the optical element can be aligned inside the mounting ring through displacement of the compression elements.

US 2010/0097697 A1 discloses a further mount assembly in one embodiment of which referring to FIG. 16 an optical element is held inside a mounting ring via spring arrangements. The spring arrangements are formed in each instance by a cup mounted on the mounting ring in which a rod and a spring arranged in a line act on the optical element. This type of bearing is intended to guard the optical element against damage during transport in particular.

The solutions of the above-cited references have in common that an optical element mounted in a mount is connected to a mounting ring via elastic links so as to compensate temperature-dependent differences in expansion. However, contingent upon the different expansion of the mount and optical element, reaction forces are generated at the connection points and act on the optical element. These reaction forces can lead to stresses or to changes in tension in the optical element and, therefore, change the imaging characteristics of the optical element.

No optical assembly of the type mentioned above is shown in the prior art in which a counterforce counteracting the reaction forces is generated by additional means at the connection points.

SUMMARY OF THE INVENTION

It is the object of the invention to at least partially compensate reaction forces occurring at the connection points in order to keep the optical imaging quality constant over a given temperature range.

This object is met for a thermally compensated optical assembly comprising a monolithic mount with a thermal expansion coefficient, which mount is divided by slits into a mounting ring and at least three elastic links, and an optical element with a thermal expansion coefficient that is not the same as the thermal expansion coefficient of the mount, which optical element is connected to the links at a connection point in each instance, and the elastic links are constructed such that they compensate through deformation thermal expansion differences between the mounting ring and the optical element within a temperature range from a lower threshold temperature to an upper threshold temperature, and the deformation in each instance generates a temperature-dependent reaction force with an amount and an operative direction in the connection points.

For this purpose, the quantity of compensation elements is equal to the quantity of links.

The compensation elements comprise in each instance an expansion body with a longitudinal axis and a spring element acting in direction of the longitudinal axis. The expansion bodies respectively contact the mounting ring and the spring elements respectively contact one of the links. The links and the spring elements are arranged relative to one another in such a way that they are relaxed at one of the threshold temperatures of the temperature range such that the reaction force acts in a same direction over the entire temperature range. The expansion bodies and the spring elements are configured in such a way that the compensation elements in each instance cause a temperature-dependent compensating force which brings about in each instance a counterforce at the connection points which counteracts the reaction force.

When the thermal expansion coefficient of the optical element is lower than the thermal expansion coefficient of the mount, and the links and the spring elements contact one another in such a way that they are relaxed at the lower threshold temperature, contact between the expansion body and the mounting ring is advantageously made via an outer end of the expansion body, and the spring element is constructed as a compression spring which contacts an inner end of the expansion body.

When the thermal expansion coefficient of the optical element is higher than the thermal expansion coefficient of the mount, and the links and the spring elements contact one another in such a way that they are relaxed at the upper threshold temperature, contact between the expansion body and the mounting ring is advantageously made via an outer end of the expansion body, and the spring element is constructed as a compression spring which contacts an inner end of the expansion body.

It is advantageous when the compression spring is constructed as a tubular spring and the expansion body is a preloading sleeve with an external thread formed at the outer end thereof, and the tubular spring and the preloading sleeve have an internal thread into which a calibrating pin is screwed so that the spring constant of the tubular spring is variable along the length of the calibrating pin that is screwed into the tubular spring.

When the thermal expansion coefficient of the optical element is lower than the thermal expansion coefficient of the mount, and the links and the spring elements contact one another in such a way that they are relaxed at the lower threshold temperature, contact between the expansion body and the mounting ring is advantageously made via an inner end of the expansion body, and the spring element is constructed as a tension spring which is fastened to an outer end of the expansion body.

When the thermal expansion coefficient of the optical element is higher than the thermal expansion coefficient of the mount, and the links and the spring elements contact one another in such a way that they are relaxed at the upper threshold temperature, contact between the expansion body and the mounting ring is advantageously made via an inner end of the expansion body, and the spring element is constructed as a tension spring which is fastened to an outer end of the expansion body.

The longitudinal axes are advantageously arranged so as to be aligned with the operative directions of the reaction forces extending through the connection points, and the compensation elements are configured in such a way that the counterforce is equal to the compensating force.

The optical element can be connected to the links directly or indirectly via an auxiliary mount.

BRIEF DESCRIPTION OF THE DRAWINGS

The invention will be described more fully in the following with reference to embodiment examples and drawings. The drawings show.

DETAILED DESCRIPTION OF THE EMBODIMENTS

Figure 1:
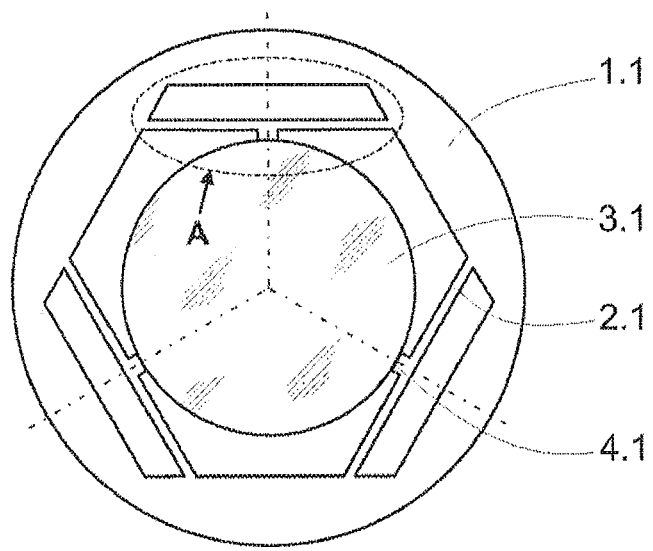
FIG. 1 is a diagram showing the formation of the reaction forces in a connection point based on an optical assembly according to the prior art.
Figure 1:
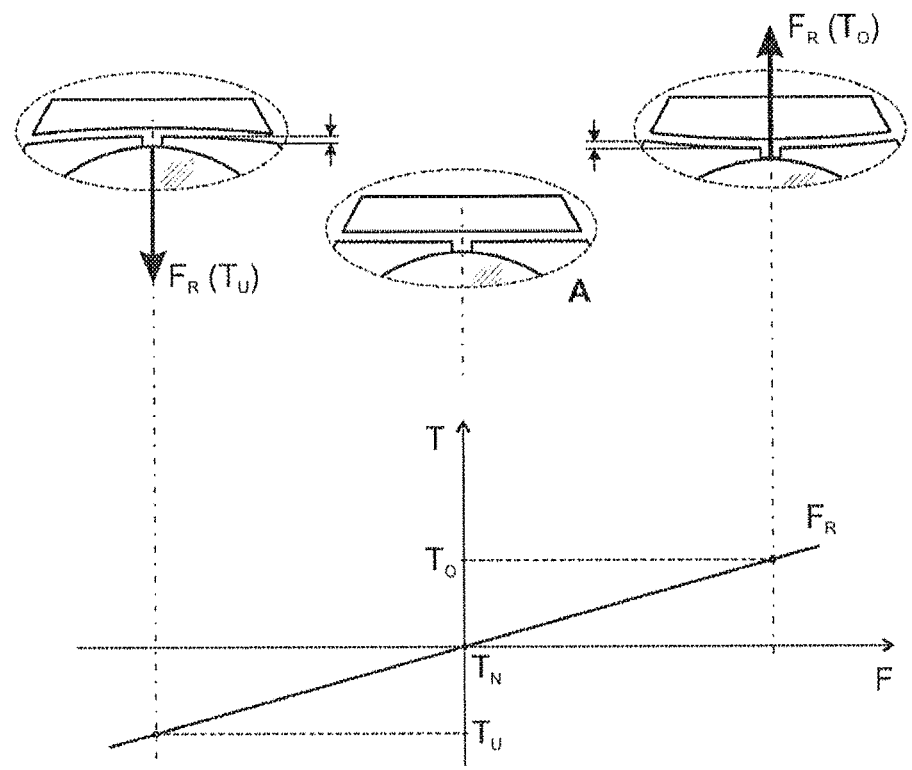

An optical assembly basically comprises a mount comprising a mounting ring 1.1, 1.2 and at least three elastic links 2.1, 2.2 formed at the mounting ring 1.1, 1.2, a quantity of compensation elements 5.1, 5.2 equaling the quantity of links 2.1, 2.2, and an optical element 3.1, 3.2 which is connected to the links 2.1, 2.2 at connection points 4.1, 4.2.

The elastic links 2.1, 2.2 are constructed in such a way that they compensate thermal expansion differences between the mounting ring 1.1, 1.2 and the optical element 3.1, 3.2 through deformation within a temperature range between a lower threshold temperature $T_u$ and an upper threshold temperature $T_o$. As used herein, "deformation" means the bending of elastically compliant members as well as an adjustment of rigid members which are connected to one another via elastic members.

The mount is fabricated monolithically and is formed by a ring which is divided by slits into mounting ring 1.1, 1.2 and links 2.1, 2.2.

The compensation elements 5.1, 5.2 are mounted in the mounting ring 1.1, 1.2 and are formed in each instance of an expansion body 8.1, 8.2 with a longitudinal axis 7.1, 7.2 and a spring element 11.1, 11.2 acting in direction of the longitudinal axis 7.1, 7.2. An outer end 9.1, 9.2 of the expansion body 8.1, 8.2 mounted in the mounting ring 1.1, 1.2 is directed toward the outer circumference of the mounting ring 1.1, 1.2, and an inner end 10.1, 10.2 is directed toward the optical element 3.1, 3.2. The expansion body 8.1, 8.2 is made of a material with a thermal expansion coefficient of the compensation element $\alpha_K$. The spring deflection by which the spring element 11.1, 11.2 is extended or compressed, respectively, over the temperature range, and therefore the spring characteristic of the spring element 11.1, 11.2, can be influenced by means of the selection of material of the expansion body 8.1, 8.2 and the dimensioning thereof, particularly its length along the longitudinal axis 7.1, 7.2.

The expansion body 8.1, 8.2 contacts the mounting ring 1.1, 1.2 and the spring element 11.1, 11.2 contacts an application point 6.1, 6.2 at one of the links 2.1, 2.2. The material and dimensioning of the compensation elements 5.1, 5.2 substantially depend on the reaction force $F_R$ and are therefore dependent on the material and dimensioning of the mount and of the optical element 3.1, 3.2 and the elasticity of the links 2.1, 2.2.

Compensation elements 5.1 are advantageously mounted in mounting ring 1.1 in such a way that the longitudinal axes 7.1 of the compensation elements 5.1 extend so as to be aligned with the operative directions of the reaction forces $F_R$ through the connection points 4.1; that is, the application points 6.1 do not lie on a straight line extending through the connection points 4.1 in operative direction. The compensation elements 5.1 need then only bring about a compensating force $F_K$ equal to a counterforce $F_G$ which changes in opposite mathematical sign and amount, ideally equal to the reaction forces $F_R$.

Compensation elements 5.2 can also be arranged so as to be offset relative thereto; that is, the application points 6.2 do not lie on a straight line extending through the connection points 4.2 in operative direction of the reaction force $F_R$. This may be required particularly when the link 2.2 offers no application point 6.2 or installation option at which the compensation elements 5.2 can be arranged so as to be aligned with the operative directions of the reaction forces $F_R$ through the connection points 4.2. The compensation elements 5.2 are then so configured and arranged in the mount with their longitudinal axis 7.2 that in each instance they generate a compensating force $F_K$ with an amount and an operative direction at the application point 6.2 on one of the links 2.2 such that there is brought about in the connection point 4.2 a counterforce $F_G$ which counteracts the reaction force $F_R$ and which ideally compensates for the latter over the temperature range, and a moment caused by the offset is canceled.

In order to achieve the compensating effect for the temperature range, the direction of the occurring reaction force $F_R$ may not change during the rise or fall in temperature. For this reason, the mount and the compensation elements 5.1, 5.2 must be installed together in such a way that they relax at the same temperature either below or at the lower threshold temperature $T_u$ (when the expansion coefficient of the optical element is lower than that of the mount) or above or at the upper threshold temperature $T_o$ (when the expansion coefficient of the optical element is higher than that of the mount). As a result, they are installed under preloading at a nominal temperature $T_N$ which is commonly accepted as 25° and lies within the temperature range. It is important that the preloading is carried out before the optical element 3.1, 3.2 is installed in the mount. Since the preloading of the compensation element 5.1, 5.2, which causes a compensating force $F_K$, and the preloading of the link 2.1, 2.2 ideally compensate one another, no force acts upon the optical element 3.1, 3.2, and the latter is held in the mount in the absence of force.

Ideally, the force acting upon the optical element 3.1, 3.2 over an extended temperature range is completely canceled by the addition of the counterforces $F_G$ and the reaction forces $F_R$ at the connection points 4.1, 4.2. This step distinguishes an optical assembly according to the invention from all of the generic optical assemblies known from the art.

As was already mentioned, the compensation elements 5.1, 5.2 are component parts with a rigid expansion body 8.1, 8.2 paired with a spring element 11.1, 11.2.

Advantageous constructions of the compensation elements 5.1, 5.2 are described in the following by way of two embodiment examples for the optical assembly referring to FIGS. 3 and 4.

These two embodiment examples show a further development of two optical assemblies as known from the prior art and as described in the introductory part. Thus they represent two selected examples of thermally compensated optical assemblies in which links 2.1, 2.2 are deformed depending on temperature so that a reaction force $F_R$ is generated in each instance at the connection points 4.1, 4.2 of the mounted optical element 3.1, 3.2 with the links 2.1, 2.2.

In accordance with the teaching for arranging and carrying out the compensation elements 5.1, 5.2 which is demonstrated with reference to these two embodiment examples, other optical assemblies of this type, for example, also those of DE 10 2010 008 756 A1 or DE 10 2010 022 934 A1 which were acknowledged in the introductory part, can be further developed.

The formation of reaction forces $F_R$ will be described in the following for the two selected examples.

FIG. 1 shows an optical assembly, described already in the introductory part, according to DE 10 2006 060 088 A1 with a monolithic mount comprising a mounting ring 1.1 and three elastic links 2.1 and an optical element 3.1 which is held in the mount via three connection points 4.1. The mount is made of a material with a thermal expansion coefficient $\alpha_F$ which is higher in comparison with the thermal expansion coefficient of the optical element $\alpha_E$. Accordingly, during changes in temperature from a nominal temperature $T_N$, the mounting ring 1.1 in particular undergoes a greater expansion or contraction than the optical element 3.1. The consequent deformation of the links 2.1, in this case flexural elements which are each fixed on both sides and which respectively form one of the connection points 4.1 with the optical element 3.1 in the center, results in reaction forces $F_R$ which act radially in the connection points 4.1 and whose direction changes at a reversal point at the nominal temperature $T_N$ when the optical assembly has been installed in relaxed state at the nominal temperature $T_N$.

Figure 2:
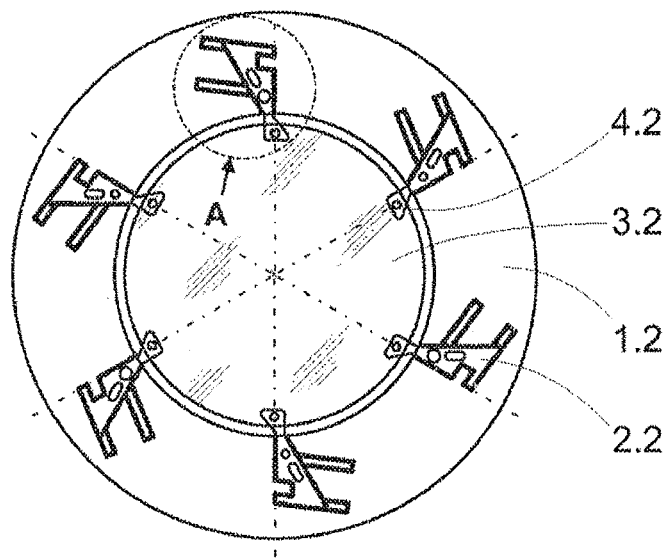
FIG. 2 is a diagram showing the formation of the reaction forces in a connection point based on an optical assembly according to the not-prior-published DE 10 2013 109 185 B3.
Figure 2:
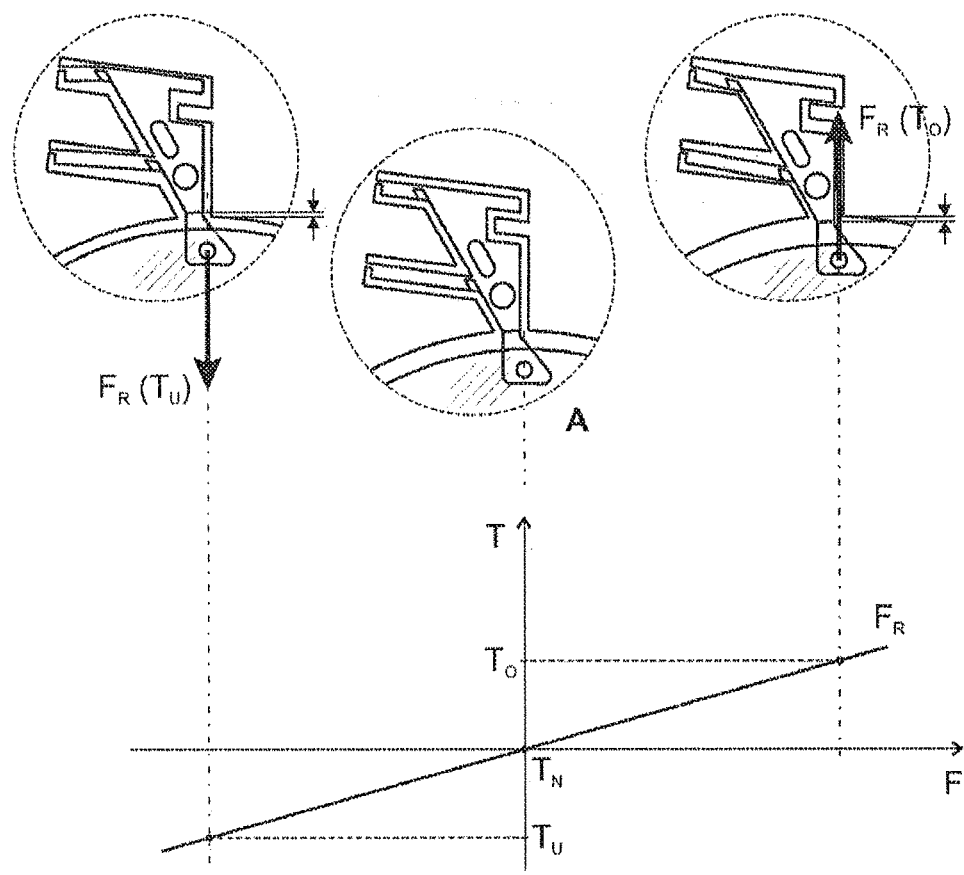

FIG. 2 shows an optical assembly, also described already in the introductory part, according to not-prior-published DE 10 2013 109 185 A1 with a monolithic mount comprising a mounting ring 1.2 and three elastic links 2.2 and an optical element 3.2 which is held in the mount via three connection points 4.2. In this case again, the mount is made of a material with a thermal expansion coefficient $\alpha_F$ that is higher in comparison with the thermal expansion coefficient of the optical element $\alpha_E$. Accordingly, in this case too, during changes in temperature the mounting ring 1.2 in particular undergoes a greater expansion or greater contraction than the optical element 3.2. The consequent deformation of the links 2.2, formed in this case by couplers which are connected to one another and to the mounting ring 1.2 via flexural elements, lead to linear reaction forces $F_R$ preferably acting radially in the connection points 4.2.

Figure 3:
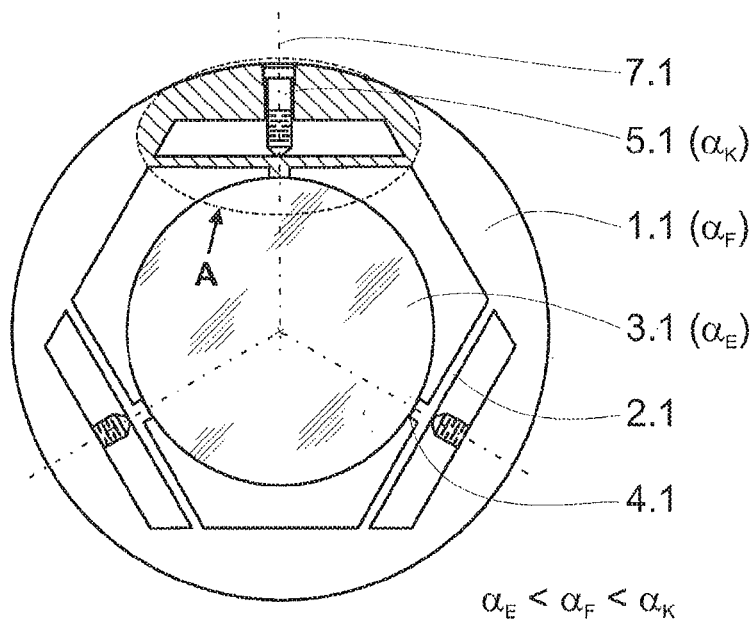
FIG. 3 is a first embodiment example of an optical assembly with a force-temperature diagram.
Figure 3:
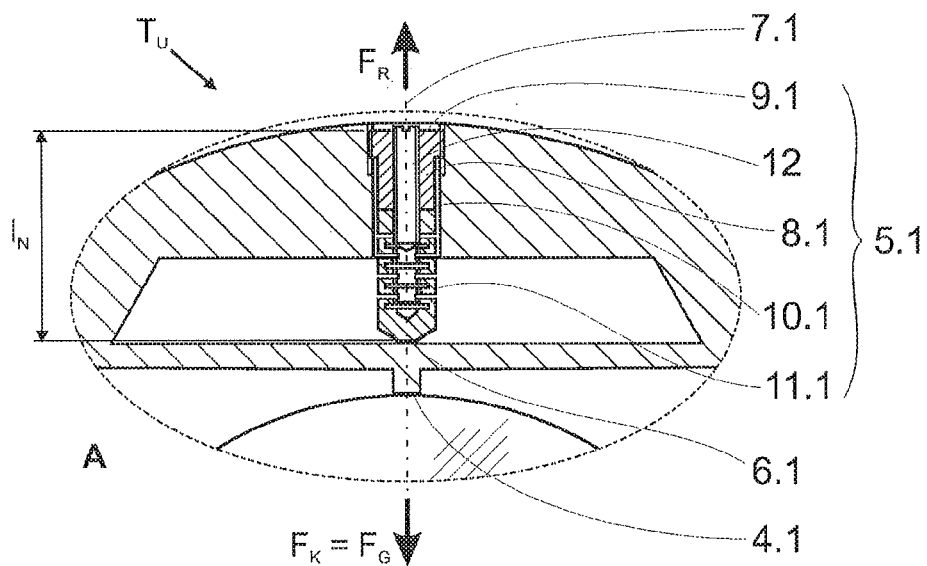
Figure 3:
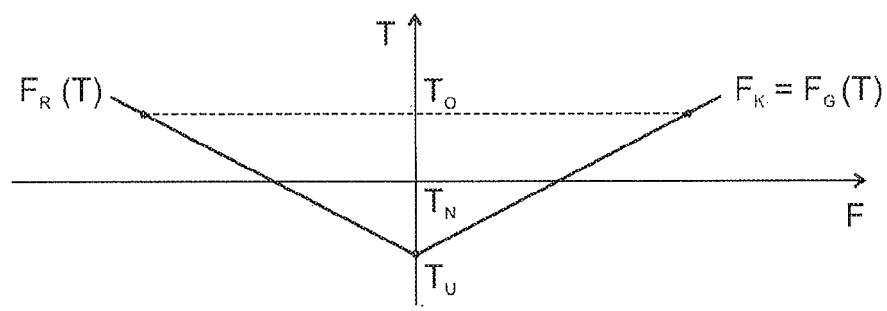

A first embodiment example for an optical assembly is shown in FIG. 3. The optical assembly constructed in this way has all of the characteristic features of the optical assembly according to DE 10 2006 060 088 A1 which was described referring to FIG. 1 and, in addition, three compensation elements 5.1. The optical element 3.1 is made of fused quartz, for example, the compensation elements 5.1 are made of aluminum, for example, and the mount is made of steel, for example. According to the example of the selection of material, the thermal expansion coefficient of the optical element $\alpha_E$ is lower than the thermal expansion coefficient of the mount $\alpha_F$ which, in turn, is lower than the thermal expansion coefficient of the compensation element $\alpha_x$. The compensation elements 5.1 are identically constructed and will be described in the following referring to one of the compensation elements 5.1 which is associated with one of the links 2.1 and, therefore, with one of the connection points 4.1.

The compensation element 5.1 comprises an expansion body 8.1 which is constructed in this instance as a preloading sleeve with an external thread and an internal thread, a spring element 11.1 which in this case is a compression spring constructed especially as a tubular spring with an internal thread identical to that of the preloading sleeve, and a calibrating pin 12 with an external thread which is compatible with the internal threads. The preloading sleeve and the tubular springs are arranged so as to be aligned one behind the other along the longitudinal axis 7.1 and are fixedly connected to one another via the screwed-in calibrating pin 12. The spring constant—and, therefore, the spring characteristic—of the tubular spring can be altered via the depth to which the calibrating pin 12 is screwed into the tubular spring. Since the preloading sleeve, the tubular spring and the preloading sleeve are made of the same material, in this case aluminum, for example, they undergo the same changes in length along the longitudinal axis 7.1 during changes in temperature, and no tensions occur within the compensation element 5.1. In order for the reaction force $F_R$ over the entire temperature range in one direction and a compensating force $F_K$ brought about by the compensation elements 5.1 to counteract one another, the links 2.1 and, correspondingly, the spring elements 11.1 are preloaded in such a way at nominal temperature $T_N$ that they are relaxed at the lower threshold temperature $T_u$.

The compensation element 5.1 is screwed into the mounting ring 1.1 via the external thread of the preloading sleeve in radial direction, namely, to a depth such that at the lower threshold temperature $T_u$ it contacts the application point 6.1, which in this case is expanded as contact surface, at link 2.1 which is not preloaded. Because the compensation element 5.1 is fixedly connected to the mounting ring 1.1 via the external thread which is located at the outer end 9.1 of the preloading sleeve, while the inner end 10.1 of the preloading sleeve contacts the tubular spring, the compensation element 5.1 is carried along corresponding to the radial expansion of the mounting ring 1.1 and accordingly itself expands extensively in the direction opposite to the expansion of the mounting ring 1.1. Due to the comparatively smaller radial expansion of the optical element 3.1, the contacting link 2.1 deforms convexly from the point of view of the optical element 3.1. The compensation element 5.1 increasingly opposes the deformation with increasing expansion, since it expands in the opposite direction and by an amount that is greater than the difference in expansion between the mount and the optical element 3.1, and the tubular spring is accordingly increasingly compressed; that is, the proportion of the amount by which the difference in expansion is exceeded results in the compression of the tubular spring by a spring deflection that brings about a compensating force $F_K$ which, as counterforce $F_G$, completely counteracts the reaction force $F_R$.

Figure 4:
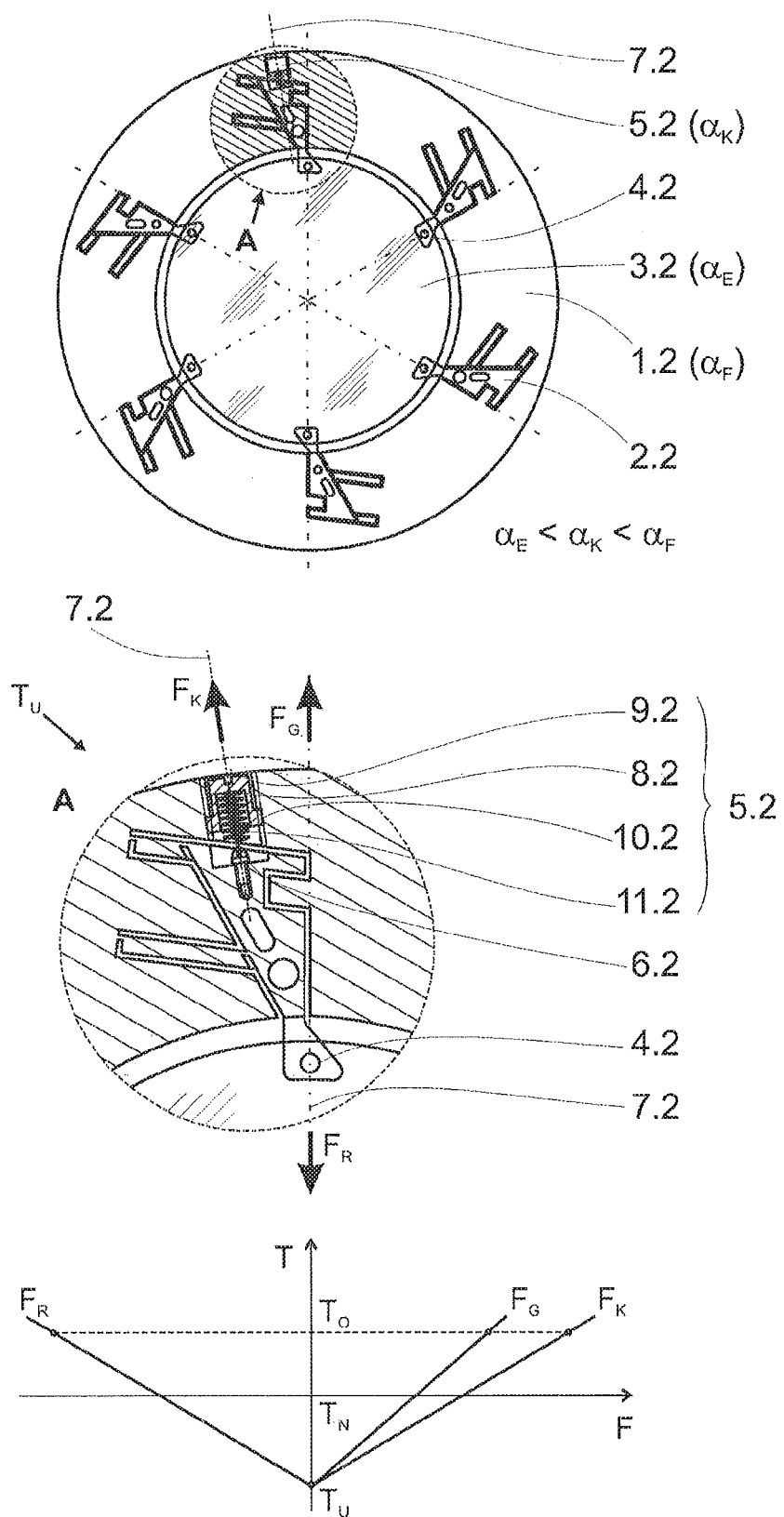
FIG. 4 is a second embodiment example of an optical assembly with a force-temperature diagram.

A second embodiment example for an optical assembly is shown in FIG. 4. It has all of the characteristic features of the optical assembly according to the not-prior-published DE 10 2013 109 185 A1 which was described referring to FIG. 2, in addition to six compensation elements 5.2. For example, the optical element 3.2 is made of fused quartz, the compensation elements 5.2 are made of steel and the mount is made of aluminum. With this material composition, the thermal expansion coefficient of the optical element $\alpha_E$ is lower than the thermal expansion coefficient of the compensation element $\alpha_K$ which, in turn, is lower than the thermal expansion coefficient of the mount $\alpha_F$. The compensation elements 5.2 are identically constructed and will be described in the following referring to one of the compensation elements 5.2.

A compensation element 5.2 comprises an expansion body 8.2 which is constructed in this instance as a preloading sleeve with an external thread at the inner end 10.2 and with a spring element 11.2 which is constructed in this instance as a helical tension spring. This spring element 11.2 can advantageously, but need not necessarily, be made of the same material as the preloading sleeve which is determining for the thermal expansion of the compensation element 5.2. The helical tension spring is secured to the outer end 9.2 of the preloading sleeve on one side and is fixed to the application point 6.2 of the link 2.2 on the other side. Although the application point 6.2 for every embodiment example advantageously lies on a line with the operative direction of the reaction force $F_R$ to be compensated, it does not lie in the operative direction of the reaction force $F_R$ in this case but rather, by way of example, is offset relative to the operative direction of the reaction force $F_R$. The compensation element 5.2 is then installed with its longitudinal axis 7.2 in the mounting ring 1.2 in such a way and dimensioned in such a way that a compensating force $F_K$ is generated which generates a first component in the operative direction of the reaction force $F_R$ with opposite direction, thus forming the counterforce $F_G$, and generates a second component which counteracts the moment brought about by the offset of the application point 6.2 relative to the operative direction of the reaction force $F_R$ through the connection point 4.2.

Because the compensation element 5.2 is fixedly connected to the mounting ring 1.2 via the external thread of the preloading sleeve, the compensation element 5.2 is carried along corresponding to the radial expansion of the mounting ring 1.2 and expands in the same direction as the mounting ring 1.2 so that the spring deflection of the spring element 11.2 is increased beyond the difference in expansion between the optical element 3.2 and the mounting ring 1.2. The spring deflection by which the helical tension spring expands in a temperature-dependent manner and accordingly brings about a compensating force $F_K$ can accordingly be optimized by way of the dimensioning of the helical tension spring and the preloading sleeve.

In order for the reaction force $F_R$ over the entire temperature range in one direction and a compensating force $F_R$ brought about by the compensation elements 5.1 to counteract one another, the links 2.2 and, correspondingly, the spring elements 11.2 are preloaded in such a way at nominal temperature $T_N$ that they are relaxed at the upper threshold temperature $T_o$.

The person skilled in the art will appreciate from the two embodiment examples that the compensation elements 5.1, 5.2 can, in principle, be installed at any location in the mounting ring 1.1, 1.2 and with an angular position of the longitudinal axis 7.1, 7.2 of less than 90° relative to the diameter of the mounting ring 1.1, 1.2 insofar as the free end of the spring element 11.1, 11.2 contacts the link 2.1, 2.2 and the compensation element 5.1, 5.2 is configured such that the generated compensating force $F_K$ is formed with respect to amount and operative direction such that it results in a counterforce $F_G$ at the connection point 4.1, 4.2 of the link 2.1, 2.2 which counteracts the reaction force $F_R$.

It is also not obligatory in constructing an optical assembly of this type that the thermal expansion coefficient of the optical element is lower than that of the mount. Rather, with access to the teaching according to the invention, the optical assembly can also be implemented for combinations of optical elements with a mount when the thermal expansion coefficient of the optical element is higher than the thermal expansion coefficient of the mount.

When the optical assembly is constructed with compensation elements 5.1, 5.2 with compression springs, the relaxed state is to be produced, conversely, for the upper threshold temperature $T_o$, whereas when the optical assembly is constructed with compensation elements 5.1, 5.2 with tension springs, the relaxed state is to be produced for the lower threshold temperature $T_u$.

It is advantageous when the dependency of the reaction force $F_R$ and the compensating force $F_K$ on the temperature is not linear. In principle, the dependency can also be nonlinear provided the curves are brought into accord with one another. When the link 2.1, 2.2 causes a nonlinear reaction force $F_R$, a spring with a nonlinear characteristic, for example, can be used for the compensation element 5.1, 5.2, or the compensation element 5.1, 5.2 is arranged in the mounting ring 1.1, 1.2 in such a way that the compensating force $F_K$ is transmitted to the connection point 4.1, 4.2 in a correspondingly nonlinear manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE CHARACTERS

1.1 mounting ring (according to a first embodiment example)
1.2 mounting ring (according to a second embodiment example)
2.1 link (according to a first embodiment example)
2.2 link (according to a second embodiment example)
3.1 optical element (according to a first embodiment example)
3.2 optical element (according to a second embodiment example)
4.1 connection point (according to a first embodiment example)
4.2 connection point (according to a second embodiment example)
5.1 compensation element (according to a first embodiment example)
5.2 compensation element (according to a second embodiment example)
6.1 application point (according to a first embodiment example)
6.2 application point (according to a second embodiment example)
7.1 longitudinal axis (according to a first embodiment example)
7.2 longitudinal axis (according to a second embodiment example)
8.1 expansion body (according to a first embodiment example)
8.2 expansion body (according to a second embodiment example)
9.1 outer end (according to a first embodiment example)

9.2 outer end (according to a second embodiment example)
10.1 inner end (according to a first embodiment example)
10.2 inner end (according to a second embodiment example)
11.1 spring element (according to a first embodiment example)
11.2 spring element (according to a second embodiment example)
12 calibrating pin
$F_R$ reaction force
$F_K$ compensating force
$F_G$ counterforce
$T_N$ nominal temperature
$T_o$ upper threshold temperature
$T_u$ lower threshold temperature
$\alpha_E$ thermal expansion coefficient of the optical element
$\alpha_F$ thermal expansion coefficient of the mount
$\alpha_K$ thermal expansion coefficient of the compensation element

What is claimed is:

1. Thermally compensated optical assembly comprising a monolithic mount with a thermal expansion coefficient, which mount is divided by slits into a mounting ring and at least three elastic links, and an optical element with a thermal expansion coefficient that is not the same as the thermal expansion coefficient of the mount, which optical element is connected to the links at a connection point in each instance, wherein the elastic links are constructed such that they compensate through deformation thermal expansion differences between the mount and the optical element within a temperature range from a lower threshold temperature to an upper threshold temperature, wherein the deformation in each instance generates a temperature-dependent reaction force with an amount and an operative direction in the connection points, characterized in that the quantity of compensation elements is equal to the quantity of links, wherein the compensation elements comprise in each instance an expansion body with a longitudinal axis and a spring element acting in direction of the longitudinal axis, and the expansion body contacts the mounting ring in each instance and the spring element contacts one of the links in each instance, wherein the links and the spring elements are relaxed at one of the threshold temperatures such that the reaction force acts over the entire temperature range in a same direction, and the expansion body and the spring element are configured in such a way with respect to their dimensioning and their thermal expansion coefficients that the compensation elements cause a temperature-dependent compensating force which brings about a counterforce at the connection points which counteracts the reaction force.

2. Thermally compensated optical assembly according to claim 1, wherein the thermal expansion coefficient of the optical element is lower than the thermal expansion coefficient of the mount, and the links and the spring elements are relaxed at the lower threshold temperature, and the contact between the expansion body and the mounting ring is made via an outer end of the expansion body, and the spring element is constructed as a compression spring which contacts an inner end of the expansion body.

3. Thermally compensated optical assembly according to claim 1, wherein the thermal expansion coefficient of the optical element is higher than the thermal expansion coefficient of the mount, and the links and the spring elements are relaxed at the upper threshold temperature, and the contact between the expansion body and the mounting ring is made via an outer end of the expansion body, and the spring element is constructed as a compression spring which contacts an inner end of the expansion body.

4. Thermally compensated optical assembly according to claim 2, wherein the expansion body has a thermal expansion coefficient that is higher than the thermal expansion coefficient of the mount.

5. Thermally compensated optical assembly according to claim 4, wherein the compression spring is a tubular spring, the expansion body is a preloading sleeve with an external thread formed at an outer end of the expansion body, and the tubular spring and the preloading sleeve have an internal thread into which a calibrating pin is screwed so that the spring constant of the tubular spring is variable along the length of the calibrating pin that is screwed into the tubular spring.

6. Thermally compensated optical assembly according to claim 1, wherein the thermal expansion coefficient of the optical element is lower than the thermal expansion coefficient of the mount, and the links and the spring elements are relaxed at the lower threshold temperature, and the contact between the expansion body and the mounting ring is made via an inner end of the expansion body, wherein the spring element is constructed as a tension spring which is fastened to an outer end of the expansion body.

7. Thermally compensated optical assembly according to claim 1, wherein the thermal expansion coefficient of the optical element is higher than the thermal expansion coefficient of the mount, and the links and the spring elements are relaxed at the upper threshold temperature, and the contact between the expansion body and the mounting ring is made via an inner end of the expansion body, wherein the spring element is constructed as a tension spring which is fastened to an outer end of the expansion body.

8. Thermally compensated optical assembly according to claim 6, wherein the expansion body has a thermal expansion coefficient that is lower than the thermal expansion coefficient of the mount.

9. Thermally compensated optical assembly according to claim 1, wherein the longitudinal axes are arranged so as to be aligned with the operative directions of the reaction forces extending through the connection points, and the compensation elements are configured in such a way that the counterforce is equal to the compensating force.

10. Thermally compensated optical assembly according to claim 1, wherein the optical element is connected to the links indirectly via an auxiliary mount.

11. Thermally compensated optical assembly according to claim 3, wherein the expansion body has a thermal expansion coefficient that is higher than the thermal expansion coefficient of the mount.

12. Thermally compensated optical assembly according to claim 11, wherein the compression spring is a tubular spring, the expansion body is a preloading sleeve with an external thread formed at an outer end of the expansion body, and the tubular spring and the preloading sleeve have an internal thread into which a calibrating pin is screwed so that the spring constant of the tubular spring is variable along the length of the calibrating pin that is screwed into the tubular spring.

13. Thermally compensated optical assembly according to claim 7, wherein the expansion body has a thermal expansion coefficient that is lower than the thermal expansion coefficient of the mount.

* * * * *